United States Patent
Ooki

(10) Patent No.: US 10,539,103 B2
(45) Date of Patent: Jan. 21, 2020

(54) AIR INTAKE DEVICE FOR INTERNAL COMBUSTION ENGINE

(71) Applicant: NISSAN MOTOR CO., LTD., Yokohama-shi, Kanagawa (JP)

(72) Inventor: Osamu Ooki, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 9 days.

(21) Appl. No.: 15/776,251

(22) PCT Filed: Nov. 20, 2015

(86) PCT No.: PCT/JP2015/082655
§ 371 (c)(1),
(2) Date: May 15, 2018

(87) PCT Pub. No.: WO2017/085856
PCT Pub. Date: May 26, 2017

(65) Prior Publication Data
US 2019/0338736 A1    Nov. 7, 2019

(51) Int. Cl.
*F02D 31/00*    (2006.01)
*F02M 35/10*    (2006.01)
*F02B 31/04*    (2006.01)
*F02M 35/112*   (2006.01)
*F02B 75/20*    (2006.01)

(52) U.S. Cl.
CPC ....... *F02M 35/10255* (2013.01); *F02B 31/04* (2013.01); *F02M 35/112* (2013.01); *F02B 75/20* (2013.01)

(58) Field of Classification Search
CPC ..... F02D 2009/0203; F02D 2009/0205; F02D 2200/0404; F02D 11/107; F02D 2011/102; F02D 9/1095
USPC .................. 123/376, 377, 399, 403; 251/298
See application file for complete search history.

(56) References Cited

U.S. PATENT DOCUMENTS

| 4,458,751 A * | 7/1984 | Haynes | E21B 17/06 166/133 |
| 4,583,568 A * | 4/1986 | Yamakawa | B65D 90/582 137/240 |
| 4,625,746 A * | 12/1986 | Calvin | F16K 17/40 137/556.3 |

(Continued)

FOREIGN PATENT DOCUMENTS

| EP | 2 772 623 A1 | 9/2014 |
| JP | 2005-233052 A | 9/2005 |

(Continued)

*Primary Examiner* — John Kwon
(74) *Attorney, Agent, or Firm* — Foley & Lardner LLP

(57) ABSTRACT

An intake device for an internal combustion engine, the intake device includes: a housing constituting an intake passage; a valve element including a valve portion arranged to open and close a part of the intake passage, and thereby to strengthen an intake air flow; and a receiving portion which is formed on a bottom wall of an aeration passage of the housing, and which is recessed in an arc shape along a movement trajectory of the valve portion, the valve portion including an outer side surface which confronts a bottom surface of the receiving portion, which has an arc shape, and which includes a seal portion that has a raised shape, and that extends along an edge portion on an upstream side of an intake direction.

3 Claims, 5 Drawing Sheets

(56) References Cited

U.S. PATENT DOCUMENTS

| | | | | |
|---|---|---|---|---|
| 4,822,000 A * | 4/1989 | Bramblet | ............... | F16K 5/0647 |
| | | | | 251/180 |
| 5,388,605 A * | 2/1995 | Banks | ................... | F16K 17/363 |
| | | | | 137/38 |
| 5,685,342 A * | 11/1997 | Ekholm | ................ | B01F 5/0451 |
| | | | | 137/605 |
| 5,785,074 A * | 7/1998 | Kieper | ................. | F16K 5/0605 |
| | | | | 137/312 |
| 6,024,125 A * | 2/2000 | Baumann | .................. | F16K 1/24 |
| | | | | 137/625.32 |
| 6,981,691 B2 * | 1/2006 | Caprera | ................ | F16K 5/0605 |
| | | | | 251/298 |
| 7,264,224 B1 * | 9/2007 | Weston | ..................... | F16K 1/18 |
| | | | | 251/298 |
| 7,484,710 B2 * | 2/2009 | Koester | ................ | F16K 5/0678 |
| | | | | 251/160 |
| 7,537,062 B2 * | 5/2009 | Hughes | .................. | E21B 34/06 |
| | | | | 166/332.8 |
| 7,687,034 B2 * | 3/2010 | Dumitrescu | ....... | G01N 35/1002 |
| | | | | 220/203.11 |
| 7,770,867 B2 * | 8/2010 | Libke | .................... | F16K 5/0407 |
| | | | | 251/209 |
| 8,479,699 B2 | 7/2013 | Ito et al. | | |
| 9,546,622 B2 | 1/2017 | Ishihara | | |
| 2004/0237931 A1 | 12/2004 | Okamoto et al. | | |
| 2010/0006053 A1 | 1/2010 | Kondo | | |
| 2011/0114051 A1 | 5/2011 | Kumagai et al. | | |
| 2013/0152895 A1 | 6/2013 | Yasuda | | |
| 2013/0153803 A1 * | 6/2013 | Adenot | ................ | F02D 9/1015 |
| | | | | 251/298 |
| 2014/0238330 A1 | 8/2014 | Matsuzaki et al. | | |
| 2015/0136055 A1 | 5/2015 | Ishihara | | |

FOREIGN PATENT DOCUMENTS

| | | |
|---|---|---|
| JP | 2008-298056 | 12/2008 |
| JP | 2011-106405 A | 6/2011 |
| JP | 2013-044415 A | 3/2013 |
| JP | 2013-124635 A | 6/2013 |
| JP | 2013-256879 A | 12/2013 |
| JP | 2014-227870 A | 12/2014 |
| JP | 2015-140699 A | 8/2015 |
| KR | 10-2008-0108362 A | 12/2008 |

* cited by examiner

AIR INTAKE DEVICE FOR INTERNAL COMBUSTION ENGINE

TECHNICAL FIELD

This invention relates to an intake device for an internal combustion engine which includes a valve element arranged to open and close an intake passage.

BACKGROUND ART

A device described in a patent document 1 and so on is known as a conventional intake device for an internal combustion engine. This intake device is arranged to control an opening area of an intake passage of an intake manifold, and thereby to form a tumble flow within a combustion chamber of the internal combustion engine. The intake device includes a holder mounted on an outlet portion of the intake manifold; and a valve element swingably supported by this holder. A raised seal portion is provided on an outer side surface of the valve element near an upstream side edge portion. A bottom plate is provided on a bottom surface of the holder. The bottom plate constitutes a receiving space for the valve element. The seal portion of the valve element is arranged to be positioned near an end edge of the bottom plate in a valve closing state, and to seal between the valve element and the holder.

However, in the conventional intake device, a clearance remained between the seal portion and the end edge of the bottom plate in the valve closing state becomes relatively large. An intake flow is decreased due to an air leakage flowing through this clearance.

PRIOR ART DOCUMENT

Patent Document

Patent Document 1: Japanese Patent Application Publication No. 2013-256879

SUMMARY OF THE INVENTION

An intake device for an internal combustion engine according to the present invention comprises a housing constituting an intake passage; and a valve element including a valve portion arranged to open and close a part of the intake passage, and thereby to strengthen an intake air flow. The intake device comprises a receiving portion which is formed on a bottom wall of an aeration passage of the housing, and which is recessed in an arc shape along a movement trajectory of the valve portion, the valve portion including an outer side surface which confronts a bottom surface of the receiving portion, which has an arc shape, and which includes a seal portion that has a raised shape, and that extends along an edge portion on an upstream side of an intake direction.

In this configuration, a clearance between the seal portion and the receiving portion bottom surface becomes small in a movement range of the valve portion. The seal portion seals a downstream side portion of the receiving portion in the valve closing state.

By the present invention, it is possible to decrease an air leakage flowing between the valve element and the bottom surface of the receiving portion in the valve closing state, and to suppress the decrease of the intake flow.

DESCRIPTION OF EMBODIMENTS

Hereinafter, one embodiment according to the present invention is explained with reference to drawings. In this embodiment, an intake device (air intake device) 1 according to the present invention is applied to an inline four cylinder internal combustion engine.

Figure 1:
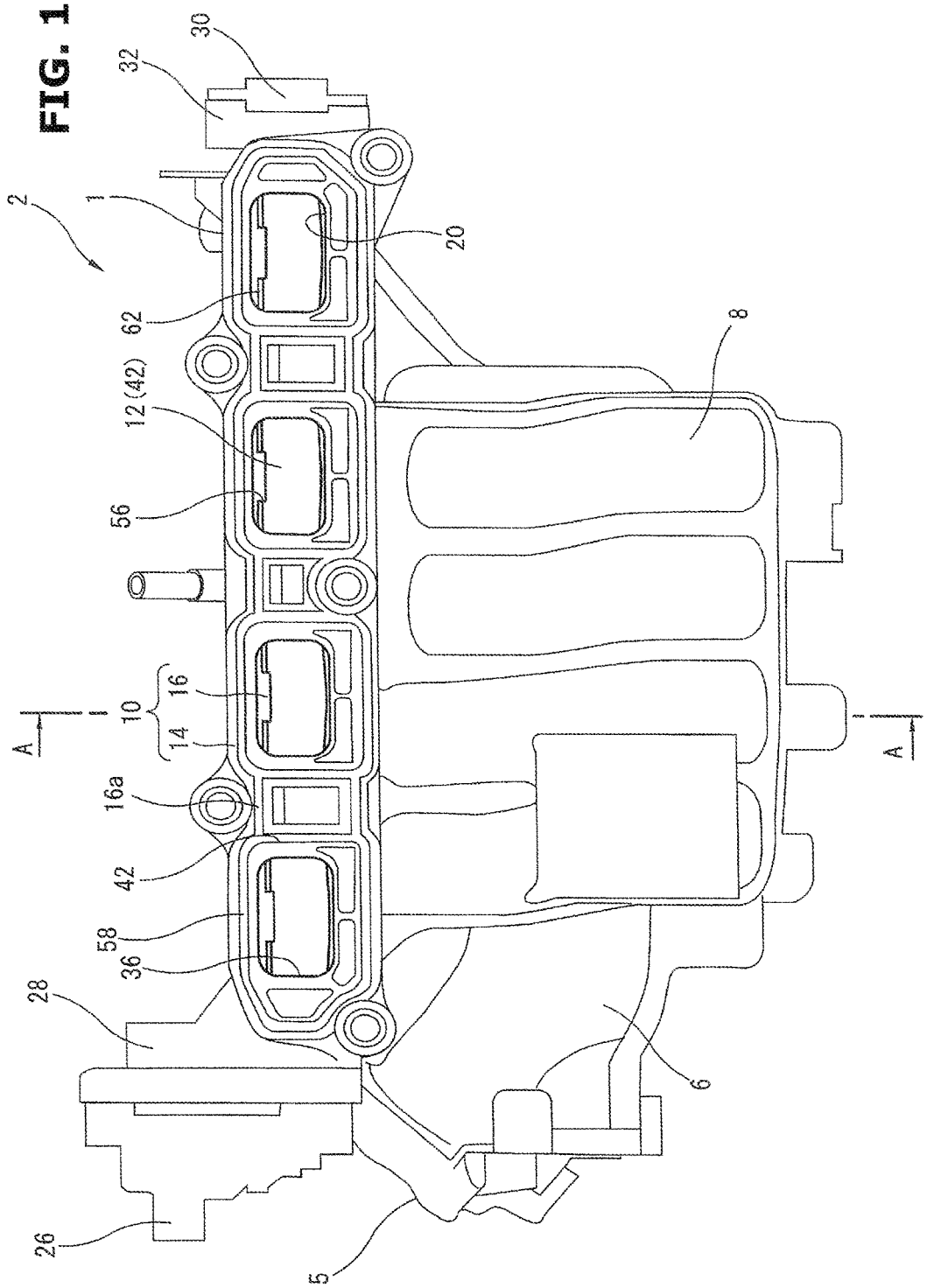
FIG. 1 is a front view showing an intake manifold provided with an intake device according to the present invention.
Figure 2:
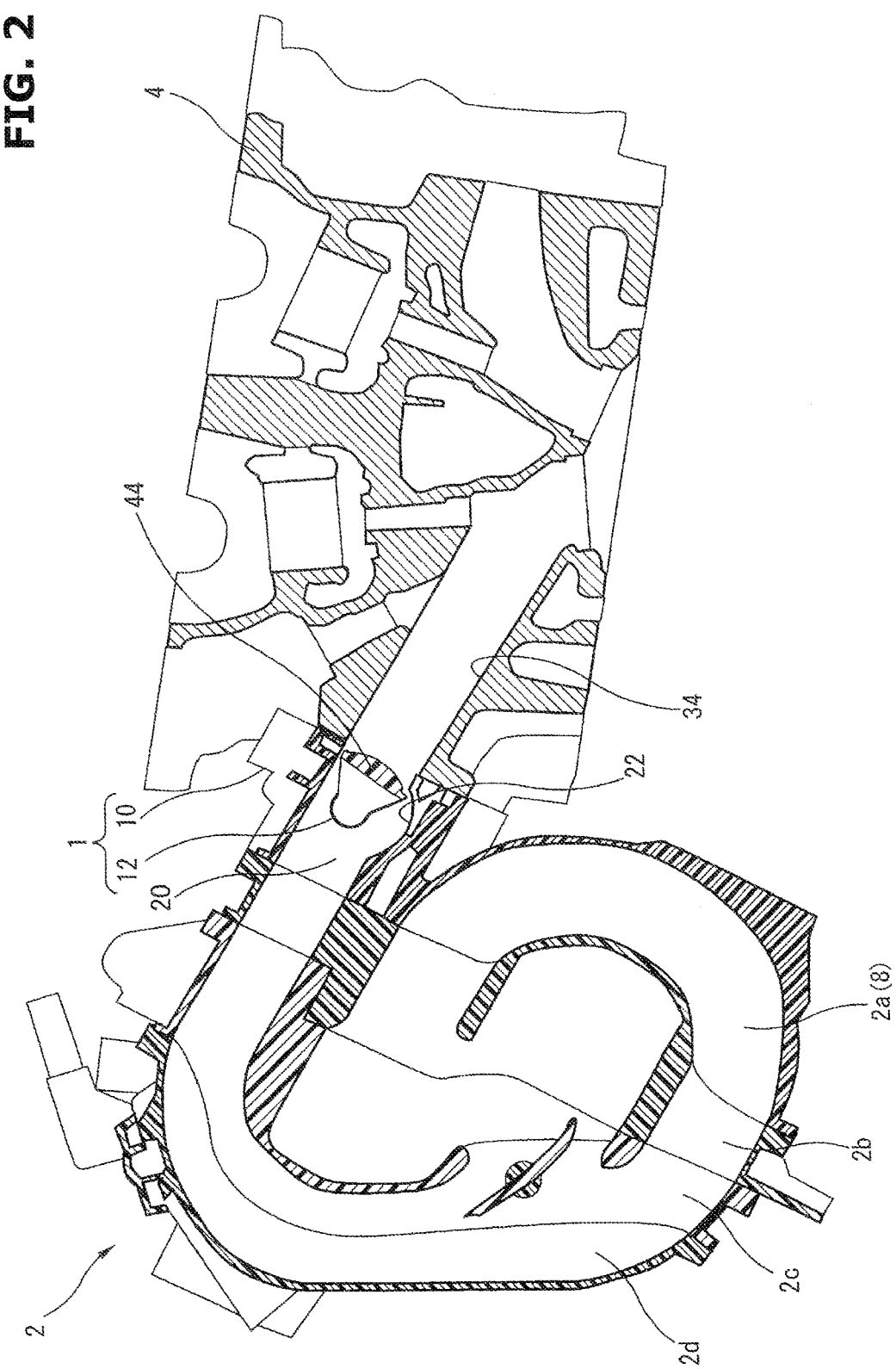
FIG. 2 is a sectional view which shows the intake manifold in a state where the intake manifold is mounted to a cylinder head, and which is taken along an A-A line of FIG. 1.

FIG. 1 is a front view showing an intake manifold 2 provided with the intake device 1 according to the present invention. FIG. 2 is a sectional view of the intake manifold 2. FIG. 2 shows a posture of the intake manifold 2 when the intake manifold 2 is mounted in a vehicle. However, the posture of the intake manifold 2 is not limited to the posture of the drawing.

The intake manifold 2 is constituted by joining four members 2a to 2d made from hard synthetic resin, by vibration welding. The intake manifold 2 includes a collector 6 to which intake air is introduced through an intake opening 5; and four branch passages 8 each of which is an intake passage, each of which extends to surround periphery of the collector 6, and each of which distributes the intake air within the collector 6 to one of the cylinders.

The intake device 1 according to the present invention constitutes a part of the intake manifold 2. The intake device 1 includes a housing 10; and a valve element assembly 12 swingably supported within this housing 10.

The housing 10 includes a housing main body 14 which has an elongated box shape extending in forward and rearward directions of the engine, and which is integrally formed with the first member 2a of the intake manifold 2; and a housing cover 16 which has an elongated shape, and which is mounted in the housing main body 14.

The housing main body 14 includes four housing passages 20 which penetrate the housing main body 14, and which constitute, respectively, parts of the branch passages 8. These four housing passages 20 are disposed to be aligned in a longitudinal direction of the housing main body 14. Each of the housing passages 20 has a substantially rectangular section. Each of the housing passages 20 has a bottom wall 20a (a wall on a lower side of the each housing passage 20 in a state where the internal combustion engine is mounted on the vehicle) including a recessed portion 22 recessed in an arc shape; and a cover receiving portion 23 which is further recessed from the recessed portion 22, and which receives a part of the cover 16 (cf. FIG. 3). Moreover, the housing main body 14 includes a flange 24 formed around a circumference of the housing main body 14, and arranged to fix the intake manifold 2 to the cylinder head 4; a flange 28 which is formed at one end portion in the longitudinal direction, and to which an actuator 26 is mounted; and a flange 32 which is formed at the other end portion in the longitudinal direction, and to which an opening degree sensor 30 is mounted.

The housing cover 16 is made from hard synthetic resin. As shown in FIG. 1, the housing cover 16 includes four opening portions 36 each of which has a substantially rectangular shape, and which correspond, respectively, to the opening ends of the intake port 34 and the housing passages 20, and which are opened to be aligned in the longitudinal direction. The housing cover 16 includes gasket grooves 37 each of which is formed on one surface (downstream side surface) of the housing cover 16 in a portion extending between adjacent opening portions 36, and each of which extends in parallel with a short side portion of one of the opening portions 36.

Figure 3:
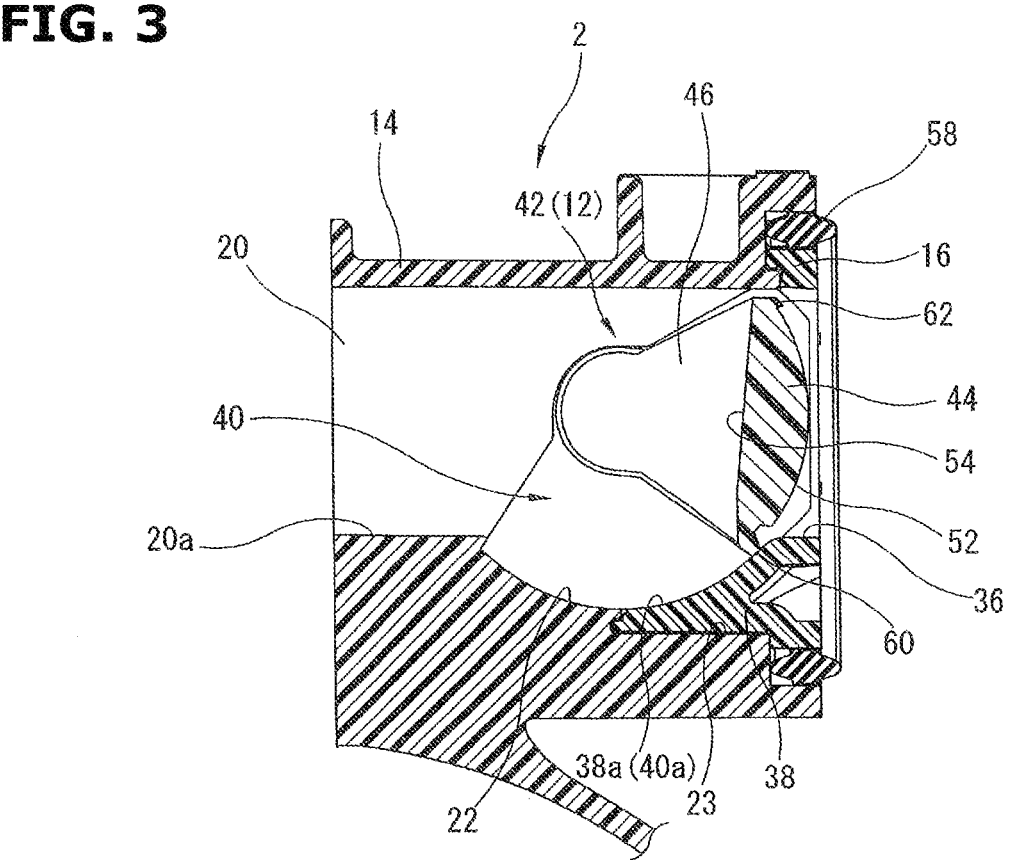
FIG. 3 is an enlarged sectional view showing a valve element in a valve closing state.

Moreover, as shown in FIG. 3, the housing cover 16 includes protruding portions 38 each of which is formed on the other end surface (upstream side surface) of the housing cover 16, and each of which protrudes in a tongue shape from a lower end portion of one of the opening portions 36. Each of the protruding portions 38 includes an inner wall surface 38a constituting a part of one of the housing passages 20. This inner wall surface 38a is curbed in an arc shape. Moreover, the upstream side surface of the housing cover 16 includes a plurality of bearing portions (not shown) which are formed to protrude at portions each extending between the opening portions 36, and both end portions in the longitudinal direction.

In a state where the housing cover 16 is mounted in the housing main body 14, the protruding portions 38 are received, respectively, in the cover receiving portions 23. Moreover, each of the inner wall surfaces 38a of the protruding portions 38 and one of the bottom surfaces of the recessed portions 22 are continuous with each other, so that valve portion receiving portions 40 are formed. Each of the valve portion receiving portions 40 receives one of the valve portions 44. Each of the valve portion receiving portions 40 has a recessed shape. The bottom surface 40a of each of the valve portion receiving portions 40 has an arc shape formed around a center of the rotation of the valve element assembly 12.

Figure 5:
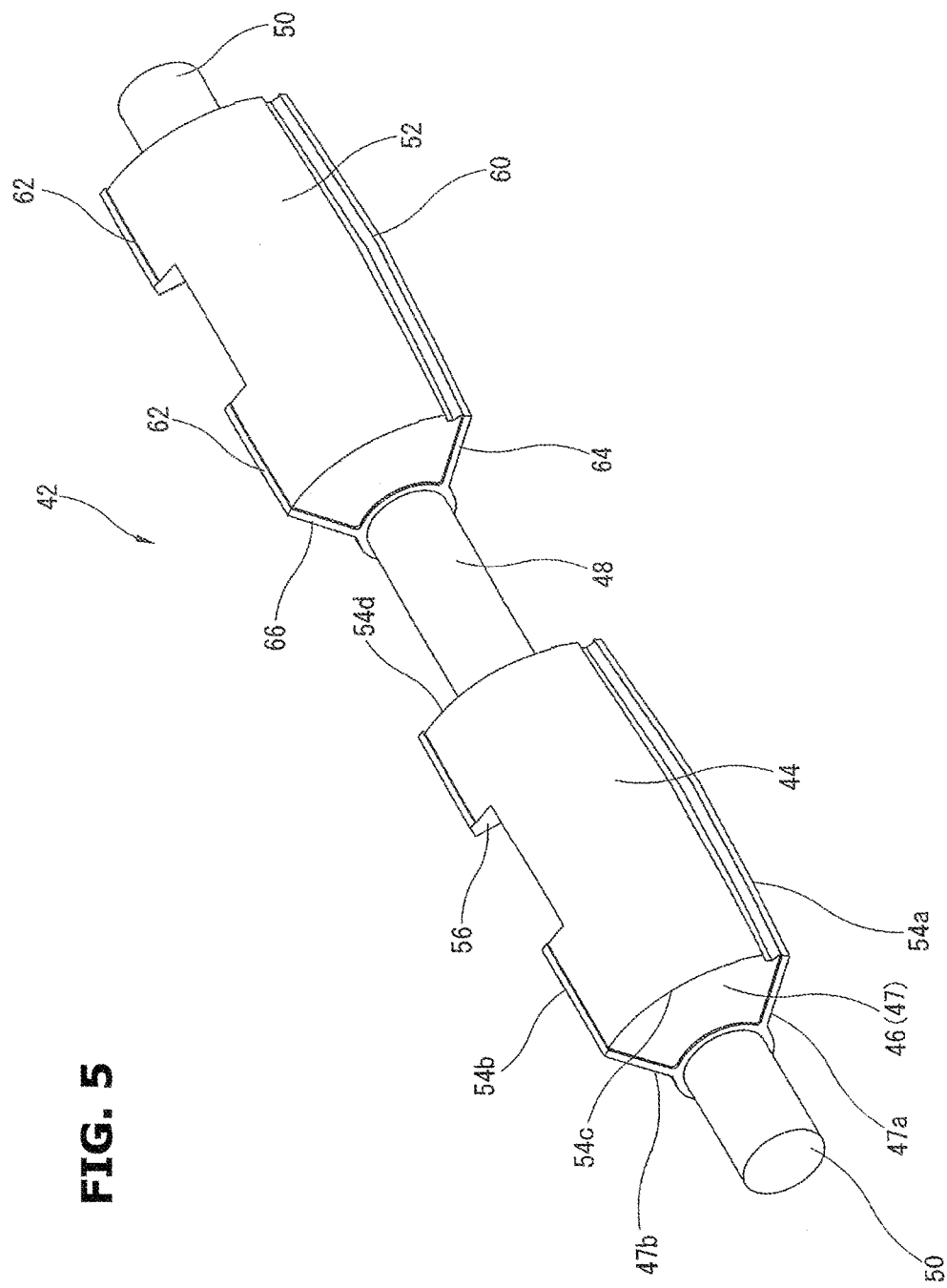
FIG. 5 is a perspective view showing the valve element.

The valve element assembly 12 is constituted by connecting a pair of valve elements 42 having an identical construction. As shown in FIG. 5, each of the valve elements 42 is integrally molded from hard synthetic resin. Each of the valve elements 42 includes two valve portions 44 each of which has a substantially rectangular shape; side wall portions 46 each of which has a sectorial shape, and which are provided on both sides of the each valve element 42; a middle rotation shaft 48 which has a cylindrical shape, and which connects two side wall portions 46 located on inner sides of the valve elements 42; and end portion rotation shafts 50 which are provided to the side wall portions 46 located on outer sides of the valve elements 42.

Figure 4:
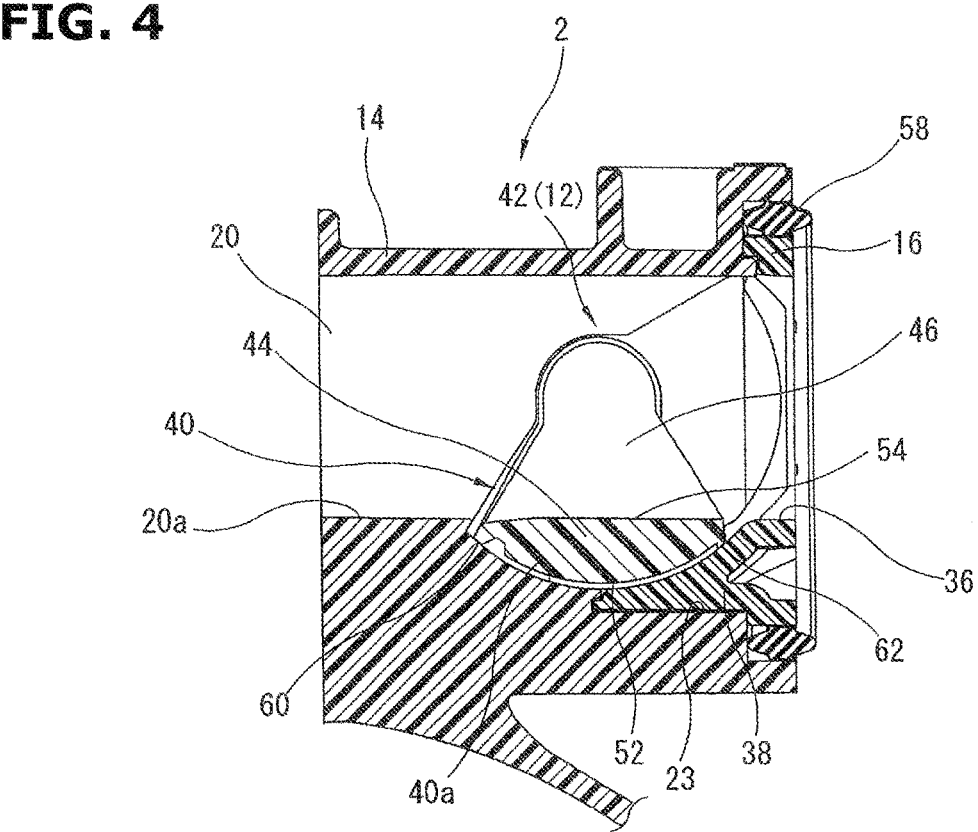
FIG. 4 is an enlarged sectional view showing the valve element in a valve opening state.

Each of the valve portions 44 is offset from the centers of the rotation shafts 48 and 50 in the radially outside direction. Each of the valve portions 44 has a thick plate shape. As shown in FIGS. 3 and 4, each of the valve portions 44 includes an outer side surface 52 having an arc shape formed around the rotation shafts 48 and 50 which serve as a center. On the other hand, the inner side surface 54 has a flat surface along a chord of the arc. Moreover, each of the valve portions 44 includes an aeration window portion 56 which has a substantially rectangular shape, and which is formed by cutting at a central portion of one of longitudinal edge portions.

The pair of the valve elements 42 constituted as described above are connected with each other to constitute the valve element assembly 12. Moreover, the actuator 26 is connected to one end of the valve element assembly 12. The opening degree sensor 30 is connected to the other end of the valve element assembly 12.

The valve element assembly 12 is inserted within the housing 14 so that the valve portions 44 are positioned, respectively, within the housing passages 20. The housing cover 16 and a gasket 58 are mounted to cover the valve element assembly 12. With these, the intake device 1 is constituted. In this state, outer wall surfaces 47 of the side wall portion 46 confront, respectively, the side wall surfaces 20a of the housing passages 20. Moreover, the outer side surfaces 52 of the valve portions 44 confront the bottom surfaces 40a of the valve portion receiving portions 40. That is, each of the bottom surfaces 40a of the valve portion receiving portions 40 is formed to have the arc shape along the movement trajectory of one of the outer side surfaces 52. Each of the bottom surfaces 40a of the valve portion receiving portions 40 and one of the outer side surfaces 52 are positioned to be concentric with each other. Moreover, the middle rotation shafts 48 and the end portion rotation shafts 50 are rotatably supported by the bearing portions (not shown) formed by the housing main body 14 and the housing cover 16.

In the thus-constructed intake device 1, as shown in FIG. 3, when the valve assembly 12 is driven and rotated by the actuator 26 in a counterclockwise direction of the drawing, the valve portions 44 are pivoted along the bottom surfaces 40a of the valve portion receiving portions 40, so that all of the housing passages 20 are simultaneously closed. At this valve closing position, the intake air introduced into the intake manifold 2 flows from the housing passages 20 through the aeration window portions 56 to the intake ports 34. With this, the tumble flow (the intake flow) is strengthened.

On the other hand, as shown in FIG. 4, when the valve element assembly 12 is driven and rotated by the actuator 26 in the clockwise direction of the drawing, the valve portions 44 are pivoted along the bottom surfaces 40a of the valve portion receiving portions 40, so that all of the housing passages 20 are simultaneously opened. At this valve opening position, each of the inner side surfaces 54 of the valve portions 44 and one of the bottom walls 20a of the housing passages 20 form a continuous surface to constitute a part of the housing passage 20. The intake air introduced into the intake manifold 2 flows through the entire surfaces of the opening portions 36. With this, the tumble flow is weakened. That is, at the valve opening position of FIG. 4, the entire valve portions 44 are received within the valve portion receiving portions 40 which are recessed in the arc shape.

Next, a seal configuration of the valve elements 42 which is a main part of the present invention is explained in detail with reference to FIG. 3 to FIG. 5.

Each of the outer side surfaces 52 of the valve portions 44 has a substantially rectangular shape constituted by a pair of long edge portions 54a and 54b extending along long sides, and a pair of short edge portions 54c and 54d extending along short sides. Moreover, the outer side surface 52 includes a first seal portion 60 protruding along the long edge portion 54a (an upstream side edge portion in the intake direction), and having a raised shape. This first seal portion 60 continuously extend in a substantially linear manner between the pair of the short edge portions 54c and 54d of the outer side surface 52. The other long edge portion 54b (a downstream side edge portion in the intake direction) includes second seal portions 62 each protruding to extend from one of the short edge portion 54c and 54d to the aeration window portion 56, and having a raised shape. A protruding amount of each of the first seal portion 60 and the second seal portions 62 from the outer side surfaces 52 is set to form a minute clearance between a tip end of the each of the seal portions 60 and 62, and one of the bottom surfaces 40a of the valve portion receiving portions 40. In this case, it is unnecessary that each of the first seal portions 60 is provided at the edge portion on the upstream side of the intake direction on the outer circumference surface 52 of one of the valve portions 44. Each of the first seal portions 60 may be provided at a position which is slightly apart from the edge portion on the downstream side of the intake direction. Similarly, it is unnecessary that each of the second seal portions 62 is provided at the edge portion on the downstream side of the intake direction on the outer circumference surface 52 of one of the valve portions 44. Each of the second seal portions 62 may be provided at a position slightly apart from the edge portion on the upstream side of the intake direction.

Moreover, each of the side wall portions 46 of the both ends of the valve portions 44 has a sectorial shape expanded from the rotation shafts 48 and 50 toward the valve portions 44. A first side seal portion 64 is provided on the outer wall surface 47 of each of the side wall portions 46. Each of the first side seal portions 64 has a raised shape. Each of the first side seal portions 64 is continuous with one of the first seal portions 60 along the one edge portion 47a (the upstream side edge portion in the intake direction) of the each outer wall surface 47. Moreover, a second side seal portion 66 is provided on the outer wall surface 47 of each of the side wall portions 46. Each of the second side seal portions 66 has a raised shape. Each of the second side seal portions 66 is continuous with one of the second seal portions 62 along the other edge portion 47b (the downstream side edge portion in the intake direction) of the each outer wall surface 47. A protruding amount of each of the first side seal portions 64 and the second side seal portions 66 from one of the outer wall surfaces 47 is set to form a minute clearance between a tip end of the each of the seal portions 64 and 66, and one of the side wall surfaces 20a of the housing passages 20. In this case, it is unnecessary that each of the first side seal portions 64 is provided at the edge portion on the upstream side of the intake direction on one of the side wall portions 46 of the both ends of the valve element 44. Each of the first side seal portions 64 may be provided at a position which is slightly apart from the edge portion on the downstream side of the intake direction. Similarly, it is unnecessary that each of the second side seal portions 66 is provided at the edge portion on the downstream side of the intake direction on one of the side wall portions 46 of the both ends of the valve element 44. Each of the second side seal portions 66 may be provided at a position slightly apart from the edge portion on the upstream side of the intake direction.

Each of the seal portions 60 and 62, and the side seal portions 64 and 66 protrudes to have a substantially rectangular section. Each of the seal portions 60 and 62, and the side seal portions 64 and 66 is integrally molded with the valve element 42 from the hard synthetic resin.

In a state where the valve element assembly 12 is disposed within the housing 10 as shown in FIG. 4, the first seal portion 60 and the second seal portion 62 confront the bottom surface 40a of the valve element receiving portion 40 through a minute clearance. The side seal portions 64 and 66 confront the side wall surface 20a of the housing passage 20 though a minute clearance.

At the valve closing position shown in FIG. 3, the second seal portion 62 is positioned near a ceiling surface of the housing passage 20. On the other hand, the first seal portion 60 is positioned at the downstream side portion of the valve portion receiving portion 40 to be overlapped with the bottom surface 40a of the valve portion receiving portion 40. With this, the first seal portion 60 seals (closes) this downstream side portion. Moreover, the first side seal portion 64 is continuous with the first seal portion 60 so as to seal between the first side seal portion 64 and the side wall surface 20a of the housing passage 20.

With these, it is possible to decrease the leakage of the intake air flowing between the first seal portion 60 and the bottom surface 40a of the valve portion receiving portion 40, and to decrease the leakage of the intake air flowing between the first side seal portion 64 and the side wall surface 20a of the housing passage 20. Accordingly, it is possible to suppress the decrease of the intake flow (the tumble flow in this embodiment) within the combustion chamber due to the leakage.

On the other hand, when the valve element 44 is driven and rotated from the valve closing position of FIG. 3, the seal portions 60 and 62 are moved along the bottom surface 40a of the valve portion receiving portion 40 to maintain the minute clearance, and positioned at the valve opening position of FIG. 4. At this valve opening position, the valve portion 44 is received within the valve portion receiving portion 40. The first seal portion 60 seals the upstream side portion of the valve portion receiving portion 40. The second seal portion 62 seals the downstream side portion of the valve portion receiving portion 40. Moreover, the side seal portions 64 and 66 seal, respectively, portions between the side seal portions 64 and 66, and the side wall surface 20a of the housing passage 20.

With this, the burnt gas, the EGR gas, and so on by the spit-back (the blow-back) does not enter into the narrow space (the gap) between the outer side surface 52 of the valve portion 44, and the bottom surface 40a of the valve portion receiving portion 40. Accordingly, it is possible to suppress the deposition in the narrow space, and to prevent the fixation of the valve portion 44 due to the deposition. Moreover, the relatively large clearance is ensured between the bottom surface 40a of the valve portion receiving portion 40, and the outer side surface 52 of the valve portion 44 to which the seal portions 60 and 62 are not provided, relative to the seal portions 60 and 62. Accordingly, the fixation of the valve portion 44 due to the freezing of the moisture is hard to be generated.

Hereinabove, one embodiment according to the present invention is explained. However, the present invention is not limited to the above-described embodiment. Various variations are applicable to the present invention.

In the embodiment, the housing main body 14 is integrally molded with the first member 2a of the intake manifold 2. However, the housing main body 14 may be integrally molded with the entire of the intake manifold 2. Alternatively, the housing main body 14 may be an independent housing.

Moreover, in the embodiment, the valve portion receiving portion 40 is molded by two separate members of the recessed portion 22 formed in the housing main body 14, and the protruding portion 38 protruding on the housing cover 16, for the molding. However, the method of forming the valve portion receiving portion 40 is arbitrary. Furthermore, in this embodiment, the pair of the valve elements 42 are connected with each other. However, two pairs of the valve elements, and so on may be connected with one another, in place of the one pair. Moreover, the valve elements 42 may be not connected to each other, and be independently formed. Furthermore, in this embodiment, the valve element 42 strengthens the tumble flow. However, the valve element may be used for strengthening the swirl flow.

The invention claimed is:

1. An intake device for an internal combustion engine, the intake device comprising:
   a housing constituting an intake passage;
   a valve element including a valve portion arranged to open and close a part of the intake passage, and thereby to strengthen an intake air flow; and
   a receiving portion which is formed on a bottom wall of an aeration passage of the housing, and which is recessed in an arc shape along a movement trajectory of the valve portion,
   the valve portion including an outer side surface which confronts a bottom surface of the receiving portion, which has an arc shape, and which includes a seal portion that has a raised shape, and that extends along an edge portion on an upstream side of an intake direction, and second seal portions each of which has a raised shape, and which are provided along an edge portion on a downstream side of the intake direction only on both sides of an aeration window formed at a center of the edge portion on the downstream side of the intake direction,
   wherein the valve element includes a pair of side wall portions positioned at both ends of the valve portion; a side seal portion is provided on an outer side surface of each of the pair of the side wall portions confronting side wall surfaces of the intake passage; each of the side seal portions has a raised shape; and each of the side seal portions is continuous with the seal portion.

2. The intake device for the internal combustion engine as claimed in claim 1, wherein the seal portion and the second seal portion confront the bottom surface of the receiving portion through a minute clearance at a valve opening position.

3. The intake device for the internal combustion engine as claimed in claim 1, wherein the valve element includes a pair of side wall portions positioned at both ends of the valve portion; a second side seal portion is provided on an outer side surface of each of the pair of the side wall portions confronting side wall surfaces of the intake passage; each of the second side seal portions has a raised shape; and each of the second side seal portions is continuous with one of the second seal portions.

* * * * *